United States Patent [19]

Okawa et al.

[11] Patent Number: 4,645,477
[45] Date of Patent: Feb. 24, 1987

[54] V-BELT ASSEMBLY FOR TRANSMITTING POWER

[75] Inventors: Susumu Okawa, Numazu; Izumi Ogino; Shigeru Okuwaki, both of Susono, all of Japan

[73] Assignee: Toyota Jidosha Kabushiki Kaisha, Toyota, Japan

[21] Appl. No.: 683,486

[22] Filed: Dec. 19, 1984

[30] Foreign Application Priority Data

Dec. 21, 1983 [JP] Japan .................. 58-239895

[51] Int. Cl.⁴ .............................................. F16G 5/16
[52] U.S. Cl. .................................... 474/201; 474/242
[58] Field of Search ........ 414/201, 240, 242, 244–247, 414/255, 265, 272

[56] References Cited

U.S. PATENT DOCUMENTS

| 420,951 | 2/1890 | Millhauser | 384/280 |
|---|---|---|---|
| 2,195,226 | 3/1940 | Reeves | 474/241 |
| 2,247,995 | 7/1941 | Gilbert | 384/280 |
| 2,358,534 | 9/1944 | Perry | 474/242 |
| 2,704,234 | 3/1955 | Love et al. | 384/280 |

FOREIGN PATENT DOCUMENTS

| 256918 | 3/1949 | Fed. Rep. of Germany | 474/201 |
|---|---|---|---|
| 0122064 | 10/1984 | Japan | 474/201 |

Primary Examiner—James A. Leppink
Assistant Examiner—Thuy M. Bui
Attorney, Agent, or Firm—Oblon, Fisher, Spivak, McClelland & Maier

[57] ABSTRACT

A V-belt assembly trained over V-belt wheels which includes a flexible endless belt, a plurality of rigid suspension members secured fixedly to the endless belt perpendicularly to the longitudinal direction of the endless belt and approximately U-shaped rigid transmission pieces pivotably supported by pivotal projections projecting sidewise from both sides of the respective suspension members and capable of engaging V-shaped grooves in the V-belt wheels. The central axis of the pivotal projections passes through the approximately central portion of the thickness of the endless belt. In the ends of both legs of the U-shaped transmission piece are formed grooves for receiving the pivotal projection of the suspension member, and lids for covering respectively these grooves are secured fixedly to the ends of the legs. Further, the transmission pieces except for at least one piece are formed with a square notch opening to the end face of both legs of "U" configuration and the surface opposed to the adjacent transmission piece and an arcuate surface-like groove formed on a portion of one of angled sides of this notch reaching the end face of the leg to contact the other side, the arcuate surface-like grooves of these transmission pieces being fitted onto the respective pivotal projections of the suspension members.

14 Claims, 13 Drawing Figures

V-BELT ASSEMBLY FOR TRANSMITTING POWER

BACKGROUND OF THE INVENTION

1. Field of the Invention

This invention relates to a V-belt assembly for transmitting power, and more particularly to a V-belt assembly suited for a continuously variable transmission.

2. Description of the Prior Art

While a rubber belt having a trapezoidal section for example is used for such a V-belt assembly, its rigidity in the lateral direction (lateral rigidity) i.e. in the direction perpendicular to the longitudinal direction is low so that it cannot transmit a large power since it is subjected to buckling deformation in the lateral direction when it meshes with the V-belt wheel. Also, the thickness of the belt, i.e. distance between the upper bottom surface and the lower bottom surface is so large that a small radius of curvature is difficult to provide and thus a large range speed ratio cannot be obtained disadvantageously.

Further while a V-belt assembly consisting of a plurality of transmission pieces through which an endless metal belt consisting of a plurality of laminated metal belt member extends and which is slidable lengthwise is known per se from Japanese Patent Publication No. Sho 55-6783, such has defects in that a frictional loss is produced to reduce the efficiency of power transmission since the transmission pieces slide along the endless belt.

SUMMARY OF THE INVENTION

An object of the present invention is to provide a V-belt assembly for transmitting power which can provide a small radius of curvature.

A further object of the present invention is to provide a V-belt assembly for transmitting power which has an improved dimensional accuracy in transmission pieces.

A still further object of the present invention is to provide a V-belt assembly for transmitting power which can prevent frictional loss between the transmission piece and endless belt and simplify assembly.

The V-belt assembly for transmitting power according to the present invention comprises a flexible endless belt, a plurality of rigid suspension members secured fixedly to this endless belt perpendicularly to the lengthwise direction of the endless belt and approximately U-shaped rigid transmission pieces supported pivotably by pivotal projections projecting sidewise for both sides of the respective suspension members and capable of engaging V-shaped grooves of V-belt wheels.

Since the transmission pieces of the V-belt assembly thus meshing with the V-belt wheels have an much larger rigidity than prior rubber belts in the direction perpendicular to the lengthwise direction of the endless belt, a large contact pressure can act on the transmission piece from the V-shaped groove side walls of the V-belt wheel so that transmission torque can be increased up to the degree of braking down the endless belt and the V-belt assembly according to the present invention can transmit remarkably larger power than the prior rubber belt. Also, the belt assembly as a whole can provide a minimum radius of curvature allowable for the endless belt so that a large range of speed ratios can be realized. Further, since the endless belt is surrounded by the suspension member and in addition by the rigid transmission piece, it is never subjected to the contact pressure of the V-shaped groove when it meshes with the V-belt wheel so that it can be designed in consideration of only tension forces without considering the lateral rigidity. Further, the suspension member is secured fixedly to the endless belt and the transmission piece never contacts the endless belt so that the endless belt does not move relative to the suspension member or transmission piece and thereby the efficiency of power transmission can be further increased without producing the frictional loss. Finally, since the transmission piece can deviate widthwise of the endless belt relative to the suspension member, the side wall of the transmission piece can contact uniformly the side wall of V-shaped groove in the V-belt wheel.

Also, according to the present invention, the central axis of the pivotal projection passes through the approximately central portion of thickness of the endless belt. Thus, when the V-belt assembly means with the V-belt wheel, the pivotal projection will be located on the curved surface made by the central portion of thickness of the endless belt to pivot the transmission piece more smoothly.

Also, both legs of "U" configuration of the transmission piece are formed on the ends respectively with a groove for receiving the pivotal projection of the suspension member, and a lid for covering each groove is secured fixedly to the end of the leg. Thus, since the transmission piece can be made of an integrally formed member rather than of a pair of halved members, the dimensional accuracy in the transmission piece can be improved.

Further, according to the present invention, the transmission pieces except for at least one piece are respectively formed with a square notch opening to the end face of both legs of "U" configuration and the surface opposed to the adjacent transmission piece and an arcuate surface-like groove formed on a portion of one of angled sides of this notch reaching the end face of the leg and contacting the other side, and the arcuate surface-like grooves of these transmission pieces are respectively fitted onto the pivotal projections of the suspension members. Consequently, since the transmission piece has the square notch and arcuate surface-like groove, an operation of mounting the transmission piece on the suspension member to assemble the V-belt assembly is remarkably facilitated. Since the transmission piece can pivot freely and the endless belt is not rigid, but thin, the V-belt assembly can provide a small radius of curvature and thus a large range of speed ratios. Further, since at least one remaining transmission piece is formed on the ends of both legs of "U" configuration with grooves for receiving the pivotal projections of the suspension member respectively and lids for covering respectively these grooves are secured fixedly to the ends of legs, the assembly is further simplified.

The accompanying drawings, which are incorporated in and constitute part of this specification, illustrate embodiments of the invention and, together with the description, serve to explain the principles of the invention.

BRIEF DESCRIPTION OF THE DRAWINGS

A more complete appreciation of the invention and many of the attendant advantages thereof will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
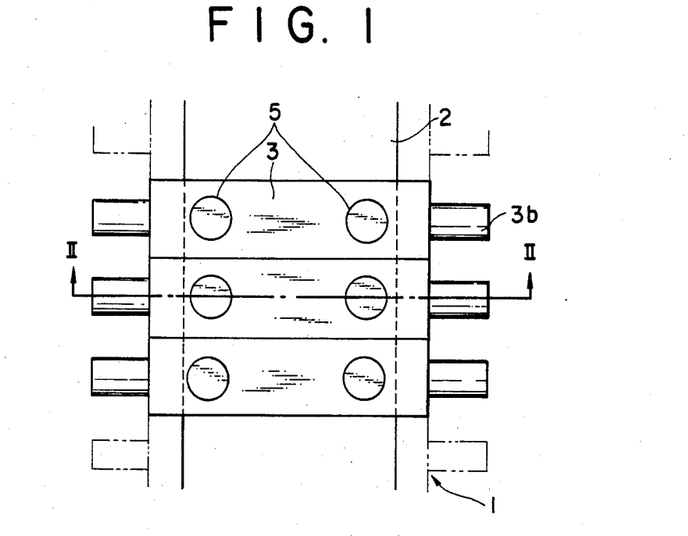
FIG. 1 is a plan view of a V-belt assembly according to the present invention.
Figure 2:
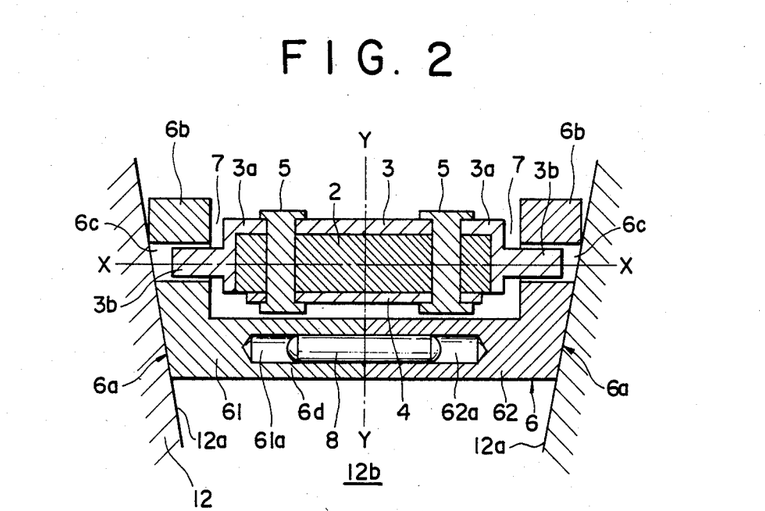
FIG. 2 is a sectional view taken along the line II—II in FIG. 1.

FIGS. 1 and 2 show a V-belt assembly 1 according to the present invention which includes a flexible endless belt 2 made of woven fabric constituted from fiber or strings of vegetable, animal or synthetic resin which are secured fixedly to a plurality of U-shaped metal suspension members 3 surrounding the upper bottom surface and both side surfaces of the belt 2 and extending perpendicularly to the longitudinal direction of the belt together with opposed metal plates 4 bearing against the lower bottom surface of the endless belt 2 by rivets 5 extending through these members 2, 3, 4 to sandwich therebetween the endless belt 2. As is apparent from FIG. 1, these suspension members 3 are arranged close to each other in the longitudinal direction of the endless belt 2. The suspension member 3 is formed on both legs 3a of U-shaped configuration integrally with pivotal projections 3b projecting sidewise, the center axis X—X of which passes through the approximately central portion of thickness of the endless belt 2. A substantially U-shaped transmission piece 6 formed of metal, sintered alloy, ceramics or plastics and having side surfaces 6a opposed to side walls 12a, 14a of V-shaped grooves 12b, 14b in V-belt wheels 12, 14 (FIG. 4) has holes 6c provided in the legs 6b and fitted on the pivotal projections 3b to be supported pivotally by the suspension member 3 and thus the endless belt 2. As is apparent from the drawing, the diameter of the hole 6c is formed slightly larger than that of the pivotal projection 3b to produce a play. Since a gap between the outside surfaces of both legs 3a of the suspension member 3 is provided so as to be smaller than that between the inside surfaces of both legs 6b of the transmission piece 6, gaps 7 are produced between the legs 3a of the suspension member 3 and the legs 6b of the transmission piece 6. Further, since the distance between the ends of both pivotal projections 3b is selected so as to be smaller than that between both side surfaces 6a of the transmission piece 6, the ends of the pivotal projections 3b do not project from the side surfaces 6a of the transmission piece 6 even if the suspension member 3 together with the endless belt 2 is deviated sidewise relative to the transmission piece 6. The U-shaped transmission piece 6 consists of two L-shaped pieces 61, 62 which are symmetrical about the longitudinal center surface Y—Y of the endless belt 2 and coupled with each other by a common pin 8 press fitted into blind holes 61a, 61b extending coaxially from abutting surfaces of the two pieces 61, 62 in the bottom 6d of U-shaped configuration. The width d1 of the transmission piece 6 taken in the longitudinal direction of the endless belt 2 is, as apparent from FIG. 3, selected to have such a size that adjacent transmission pieces 6 contact each other in the endless belt 2 extending straight. This width d1 is narrowed like a wedge from a position 9 above the lower bottom surface of the endless belt 2, i.e. a position within the range of thickness of the endless belt 2 to the bottom side 6d. Thus, between adjacent transmission pieces 6 there remains a triangular gap 10 under the condition of the endless belt 2 being straightened. The rate of reduction of this width d1 and thus the vertical angle of the gap 10 is selected to have such a size that when the endless belt 2 is trained over the V-belt wheel with the lower bottom surface being inside the curvature, the gap 10 disappears in the minimum radius of curvature (FIG. 5).

Figures 3, 4, 5:
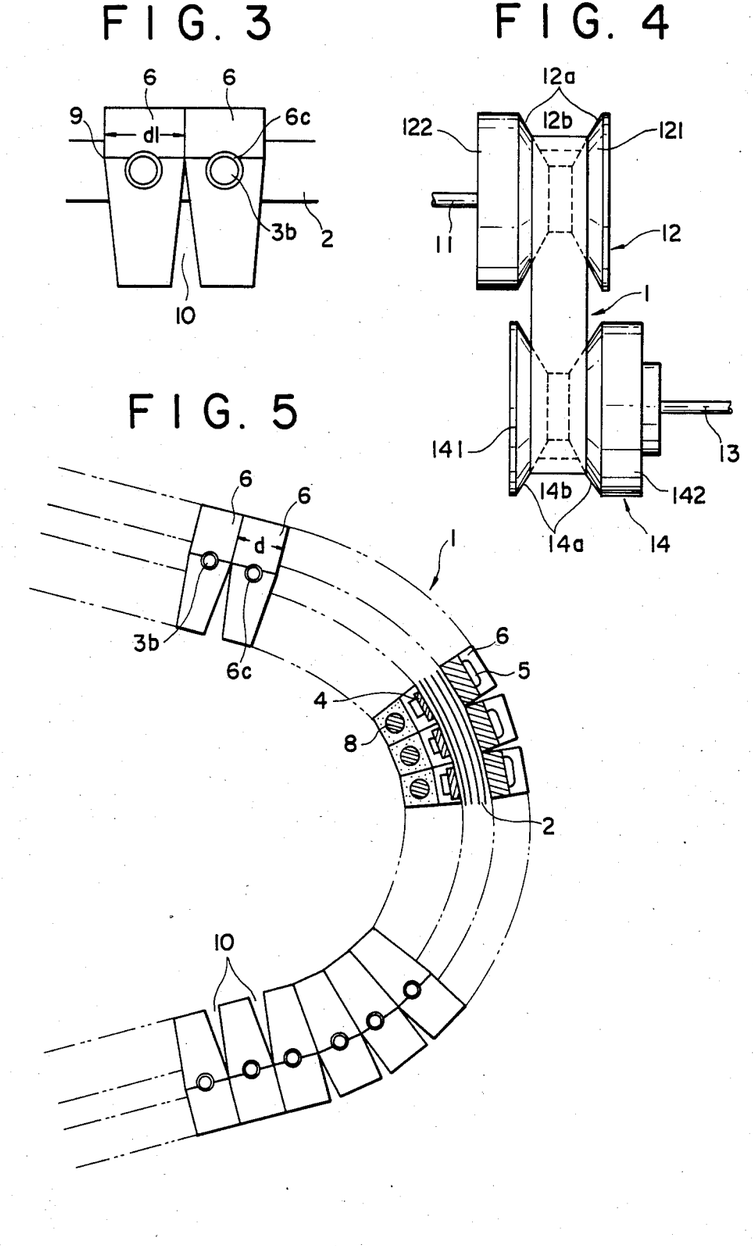
FIGS. 3 and 4 are respectively a side view and a constitutional views showing a continuously variable transmission using the V-belt assembly.
FIG. 5 is a partially cut-away side view of the V-belt assembly trained over V-belt wheels.

FIG. 4 shows a continuously variable transmission using such a V-belt assembly 1. The drive V-belt wheel 12 consisting of a truncated disk 121 provided fixedly on an input shaft 11 and a truncated disk 122 supported on the input shaft 11 movably only in the axial direction defines a V-shaped groove 12b by the conical surfaces 12a which form the side walls of the V-shaped groove 12b. A driven V-belt wheel 14 on an output shaft 13 provided parallel to the input shaft 11 also similarly consists of a fixed truncated disk 141 and a movable truncated disk 142 to define a V-shaped groove 14b with the conical surfaces 14a. The V-belt assembly 1 is trained over both V-belt wheels 12, 14 to transmit power from the input shaft 11 to the output shaft 13.

Referring to the operation of the V-belt assembly, the transmission pieces 6 of the V-belt assembly 1 engaging the V-shaped groove 12b of the drive V-belt wheel 12 receive torque of the V-belt wheel 12 from frinctional force between the side walls 12a of V-shaped groove of the V-belt wheel 12 sandwiching the transmission pieces 6 and the side walls 6a of the transmission pieces. This torque from tension of the endless belt 2 to which the suspension member 3 supporting the transmission piece 6 is secured fixedly is transmitted to the transmission piece 6 engaging the driven V-belt wheel 14 and from the transmission piece 6 to the V-belt wheel 14 in the same manner as above mentioned.

Figure 6:
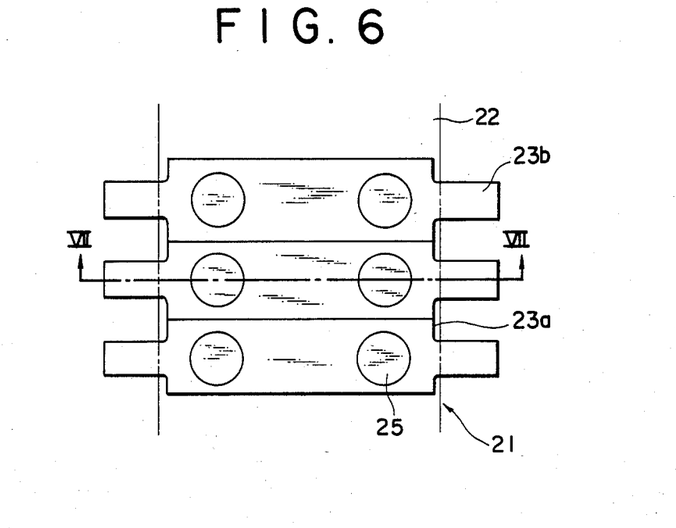
FIG. 6 is a plan view showing another V-belt assembly according to the present invention.
Figure 7:
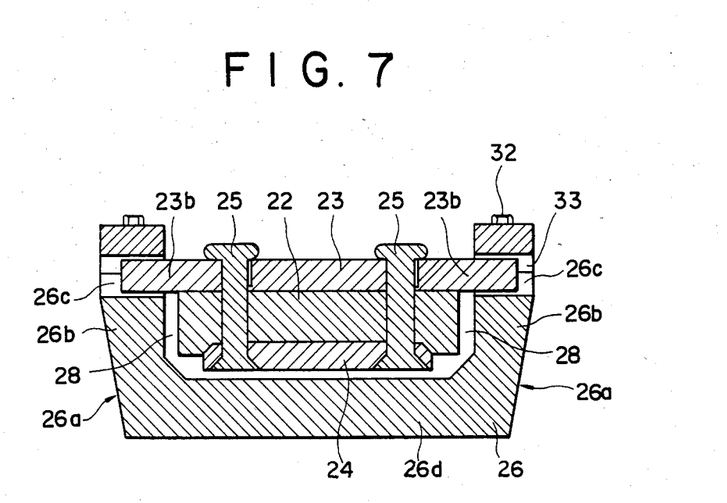
FIG. 7 is a sectional view taken along the line VII—VII in FIG. 6.
Figure 8:
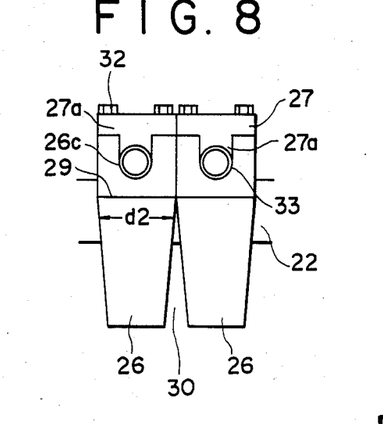
FIG. 8 is a side view of the V-belt assembly shown in FIG. 6.
Figure 9:
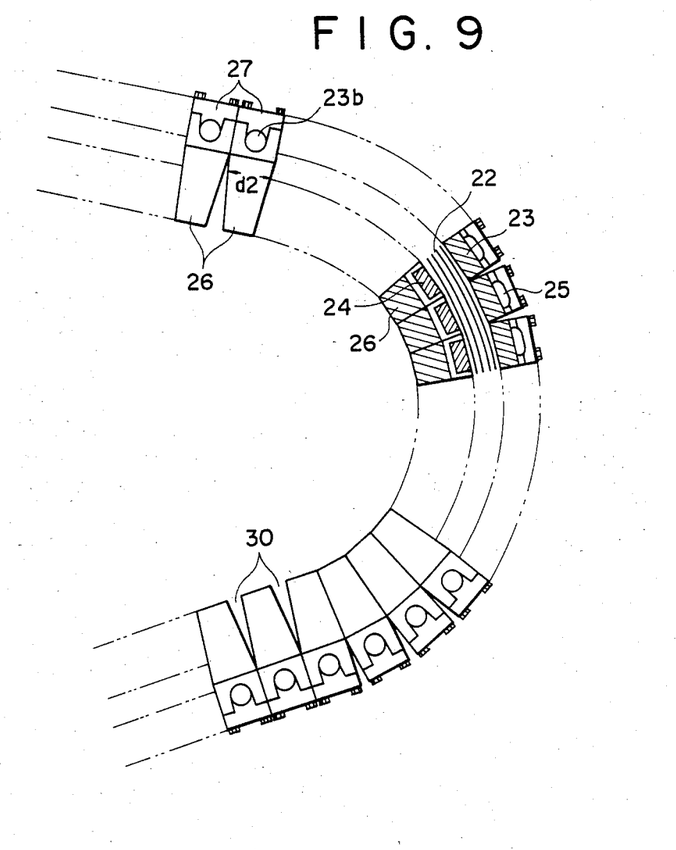
FIG. 9 is a partially cut-away side view showing a portion of the V-belt assembly trained over the V-belt wheels shown in FIG. 6.

FIGS. 6 and 7 show a V-belt assembly 21 according to the present invention. To a flexible endless belt 22 made of a woven fabric constituted from fiber or strings of vegetable, animal or synthetic resin is secured fixedly a plurality of metal strip piece-like suspension members 23 extending perpendicularly to the longitudinal direction of the endless belt 22 together with opposed metal plates 24 by rivets 25 extending through these members 22, 23, 24 to sandwich together the upper and lower bottom surfaces of the endless belt 22 between the suspension member 23 and the opposed plate 24. As is apparent from FIG. 6, these suspension members 23 are arranged close to each other in the longitudinal direction of the endless belt 22. The suspension member 23 is integrally formed on both sides 23a projecting slightly sidewise from the endless belt 22 with pivotal projections 23b projecting sidewise. To support substantially U-shaped rigid transmission piece 26 made of metal, sintered alloy, ceramics or plastics and having side surfaces 26a corresponding to the side walls 12a, 14a of V-shaped grooves 12b, 14b in V-belt wheels 12, 14 (FIG. 4) on a suspension member 23 and thus pivotable support an endless belt 22, the transmission piece 26 is formed on the centers of end faces of both legs 26b with U-shaped grooves 26c having the width slightly larger than the diameter of the pivotal projection 23b as shown in FIG. 8. In the drawing, the depth of the groove 26c is selected so as to be larger than the width thereof. After the pivotal projections 23b of the suspension member 23 are received in the grooves 26c, a lid 27 having projections 27a fitted in the grooves 26c is applied against the end faces of legs 26b and secured fixedly to the transmission piece 26 by screws 32. The end of the projection 27a is formed with a curved surface having the same curvature as the bottom of the groove 26c. Thus, a hole 33 is formed by the transmission piece 26 and the lid 27 to support rotatably the pivotal projection 23b of the suspension member 23 with a play. The lid 27 may be secured fixedly to the transmission piece 26 by welding or bonding instead of the screw 32. Also, when the depth of the U-shaped groove 26c is selected to be approximately the same as the width, the projection 27a of the lid 27 can be omitted. Since the distance between both side surfaces 23a of the suspension member 23 is formed so as to be smaller than the distance between the inside surface of both legs 26b of the transmission piece 26, a gap 28 will be produced between the side surface 23a of the suspension member and thus the side surface of the endless belt 22 and the inside surface of leg 26b of the transmission piece 26. Further, the distance between the ends of both pivotal projection 23b is selected so as to be smaller than the distance between both side surfaces 26a of the transmission piece 26 so that the end of the projection 23b does not project from the side surface 26a of the transmission piece 26 even if the suspension member 23 together with the endless belt 22 is deviated sideways relative to the transmission piece 26. The width d2 of the transmission piece 26 taken in the longitudinal direction of the endless belt 22 is selected to have such a size that the adjacent transmission pieces 26 contact each other in the endless belt 22 extending straight as is apparent from FIG. 8. This width d2 is narrowed from a position 29 above the lower bottom surface of the endless belt 22, i.e. a position within the range of thickness of the endless belt 22 to the bottom side 26d like a wedge. Thus, between adjacent transmission pieces 26 there remains a triangular gap 30 under the condition of straight endless belt 22. The reduction rate of this width d2, and thus the vertical angle of the gap 30, is selected to have such a size that when the endless belt 22 is trained over the belt wheel with its lower bottom surface being inside the curvature the gap 30 disappears in the minimum radius of curvature (FIG. 9).

Figure 10:
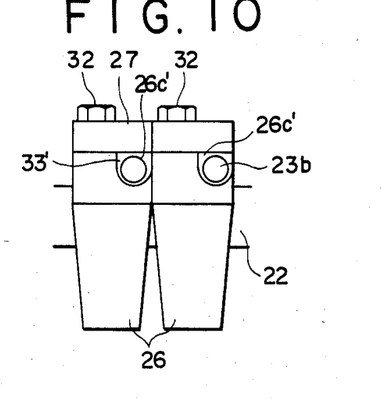
FIG. 10 is a side view showing a further embodiment of transmission pieces.

In FIG. 10, the groove 26c' for receiving the pivotal projection 23b of the suspension member 23 is formed to open to the end face of leg 26b of the transmission piece 26 and the surface opposed to adjacent transmission piece and provide a hole 33' closed by the lid 27 and adjacent transmission piece.

Figure 11:
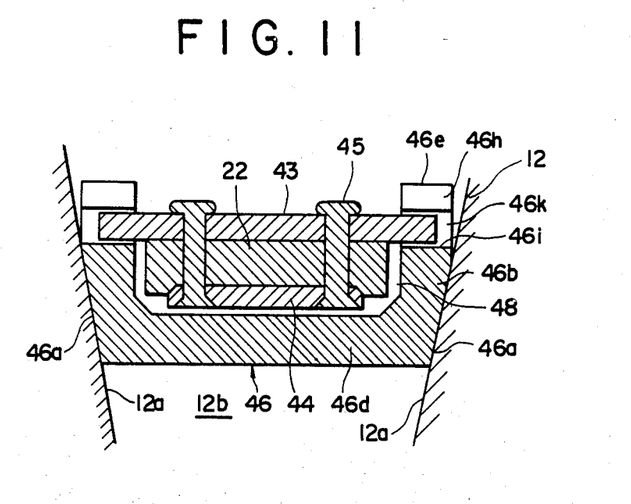
FIG. 11 is a sectional view showing another V-belt assembly according to the present invention.
Figure 12:
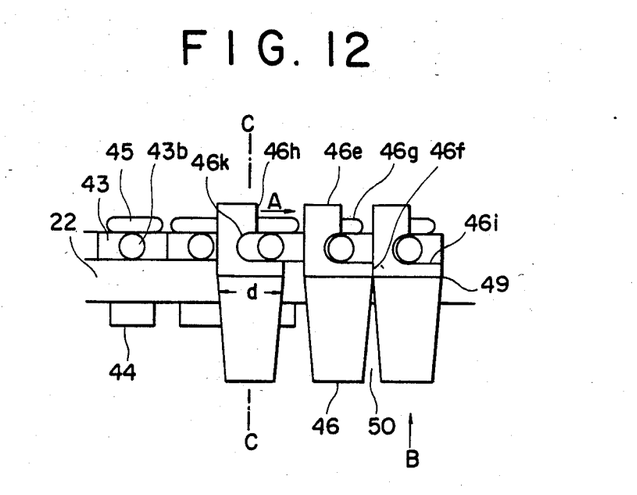
FIG. 12 is a side view of the V-belt assembly shown in FIG. 11.
Figure 13:
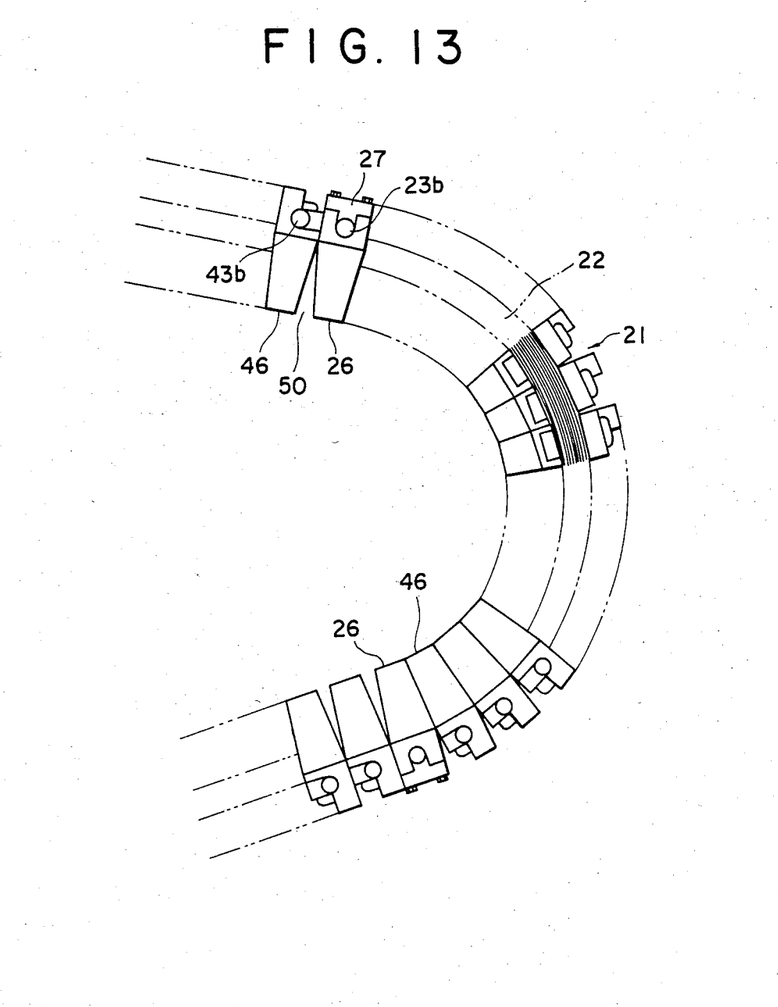
FIG. 13 is a partially cut-away side view showing the V-belt assembly trained over the V-belt wheels shown in FIG. 11.

FIG. 11 shows a modification of the V-belt assembly 21 in FIG. 6. The V-belt assembly 21 has at least one transmission piece 26 (having same constitution as that in FIGS. 7 and 8) and a transmission piece 46 occupying the other part. The transmission piece 46 is formed with a square notch 46g opening to the end faces 46e of both legs 46b of the transmission pieces 46 and the surface 46f opposed to the adjacent transmission piece and an arcuate surface-like groove 46k formed on a portion of one side 46h reaching the leg end face 46e in the angled sides of the notch 46g and having the center on the center line (C—C) in the plate thickness direction of the transmission piece 46 contacting the other side 46i and an arc somewhat larger than a cylindrical pivotal projection 43b. The length of the leg end face 46e is preferably the plate thickness d2 of the transmission piece 46 or somewhat larger. When the transmission piece 46 is mounted on the suspension member 43, the transmission piece 46 is first moved in the direction of arrow B until the side 46i of the notch 46g abuts against the pivotal projection 43b of the suspension member 43, and then moved in the direction of arrow A to fit the pivotal projection 43b in the groove 46k, so that the transmission pieces 46 can be sequentially mounted on the suspension members 43. Further, the distance between both side surfaces 43a of the suspension member 43 is formed so as to be smaller than the distance between the inside surfaces of both legs 46b of the transmission piece 46, so that a gap 48 is produced between the side surface 43a of the suspension member, thus the side surface of the endless belt 22 and the inside surface of the leg 46b of the transmission piece 46. Also, the distance between the ends of both pivotal projections 43b is selected so as to be smaller than that between both side surfaces 46a of the transmission piece 46 so that the end of the projection 43b would not project from the side surface 46a of the transmission piece 46 even if the suspension member 43 together with the endless belt 22 is deviated sideways relative to the transmission piece 46. The width d2 of the transmission piece 46 taken in the longitudinal direction of the endless belt 22 is selected to have such a size that adjacent transmission pieces 46 contact each other in the endless belt 22 extending straight, as is apparent from FIG. 12. This width d2 is narrowed from a position 49 above the lower bottom surface of the endless belts 22, i.e. a position within the range of thickness of the endless belt 22 to the bottom side 46d like a wedge. Thus, a triangular gap 50 remains between the adjacent transmission pieces 46 under the condition of straight endless belt 22. The reduction rate of this width d2, and thus the vertical angle of the gap 50, is selected to have such a size such that the gap 50 disappears in the minimum radius of curvature of the endless belt 22 when the endless belt 22 is trained over the belt wheel with the lower bottom surface being inside the curvature (FIG. 13).

When the transmission pieces 46 are thus mounted on the suspension member 43 so as to be close to each other, the last transmission piece cannot move in the direction of arrow B. Accordingly, at least one transmission piece 26 is constituted as shown in FIGS. 7 and 8.

Further in the transmission piece 26 shown in FIGS. 7 and 8, when the depth of the U-shaped groove 26c is selected to be approximately the same as the width, the projection 27a of the lid 27 also can be omitted.

It will be apparent to those skilled in the art that various modifications and variations may be made in the elements of the invention without departing from the scope or spirit of the invention.

What is claimed is:

1. A V-belt assembly trained over V-belt wheels for transmitting power comprising:
   a flexible endless belt;
   a plurality of rigid suspension members secured fixedly to the endless belt perpendicularly to the longitudinal direction of the endless belt and having pivotal projections extending from opposite sides thereof;
   a plurality of substantially U-shaped rigid transmission pieces having holes formed therein wherein said pivotal projections extending from the respective suspension members extend in sidewise directions and into said holes so as to allow for relative movement between each of said pivotal projections and said hole for engaging V-shaped grooves of the V-belt wheels wherein a center axis of the pivotal projection passes through an approximately central portion of thickness of said endless belt and wherein each of said suspension members is substantially U-shaped so as to surround one bottom surface and opposite side surfaces of the endless belt and is secured fixedly to said endless belt; and
   an opposed plate connected to each of said suspension members and positioned against a bottom surface of said endless belt opposite said one bottom surface.

2. A V-belt assembly for transmitting power according to claim 1, wherein the suspension members contact each other in the longitudinal direction of the endless belt.

3. A V-belt assembly for transmitting power according to claim 1, wherein the flexible endless belt comprises a metal belt plate.

4. A V-belt assembly for transmitting power according to claim 1, wherein the transmission piece is formed of metal.

5. A V-belt assembly for transmitting power according to claim 1, wherein the width of the transmission piece in the longitudinal direction of the endless belt is reduced such that the transmission piece forms a wedge from a position within the range of thickness of the endless belt toward the center side of curvature of the belt assembly.

6. A V-belt assembly for transmitting power according to claim 1, wherein the suspension member is substantially U-shaped to surround one bottom surface and both side surfaces of the endless belt.

7. A V-belt assembly for transmitting power according to claim 6, wherein the U-shaped suspension member is integrally formed on both legs with said pivotal projections respectively projecting sidewise.

8. A V-belt assembly for transmitting power according to claim 1, wherein the substantially U-shaped transmission piece comprises first and second L-shaped pieces symmetrical about the longitudinal center plane of the endless belt and coupled with each other at the bottom side of the U-shaped configuration.

9. A V-belt assembly for transmitting power according to claim 11, wherein the first and second L-shaped pieces have respectively blind holes extending coaxially from the abutting surfaces at the bottom side of the U-shaped configuration of the transmission piece and further comprising a common pin press fitted into these blind holes.

10. A V-belt assembly for transmitting power according to claim 1, wherein the flexible endless belt comprises a woven fabric of fiber.

11. A V-belt assembly for transmitting power according to claim 1, wherein the flexible endless belt comprises a string of material.

12. A V-belt assembly for transmitting power according to claim 1, wherein the transmission piece is formed of sintered alloy.

13. A V-belt assembly for transmitting power according to claim 1, wherein the transmission piece is formed of ceramics.

14. A V-belt assembly for transmitting power according to claim 1, wherein the transmission piece is formed of plastics.

* * * * *